US011953548B2

(12) United States Patent
Bhunia et al.

(10) Patent No.: US 11,953,548 B2
(45) Date of Patent: Apr. 9, 2024

(54) INVISIBLE SCAN ARCHITECTURE FOR SECURE TESTING OF DIGITAL DESIGNS

(71) Applicant: University of Florida Research Foundation, Incorporated, Gainesville, FL (US)

(72) Inventors: Swarup Bhunia, Gainesville, FL (US); Pravin Dasharth Gaikwad, Gainesville, FL (US); Jonathan William Cruz, Gainesville, FL (US); Sudipta Paria, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 18/152,209

(22) Filed: Jan. 10, 2023

(65) Prior Publication Data

US 2023/0228815 A1     Jul. 20, 2023

Related U.S. Application Data

(60) Provisional application No. 63/299,589, filed on Jan. 14, 2022.

(51) Int. Cl.
*G01R 31/3185* (2006.01)
*G01R 31/317* (2006.01)
(Continued)

(52) U.S. Cl.
CPC ........ *G01R 31/318536* (2013.01); *G01R 31/31719* (2013.01); *G06F 30/33* (2020.01); *G01R 31/318588* (2013.01); *G06F 2115/08* (2020.01)

(58) Field of Classification Search
CPC ...... G01R 31/318536; G01R 31/31719; G01R 31/318588; G06F 30/33; G06F 2115/08
(Continued)

(56) References Cited

U.S. PATENT DOCUMENTS

| 7,945,827 B1 * | 5/2011 | Briggs | G01R 31/318513 714/724 |
| 2003/0204801 A1 * | 10/2003 | Tkacik | G01R 31/318533 714/726 |

(Continued)

OTHER PUBLICATIONS

Chen et al., Balancing Testability and Security by Configurable Partial Scan Design, 2018, IEEE, pp. 145-150. (Year: 2018).*

(Continued)

*Primary Examiner* — John J Tabone, Jr.
(74) *Attorney, Agent, or Firm* — ALSTON & BIRD LLP

(57) ABSTRACT

Various embodiments of the present disclosure provide a scan-based architecture for register-transfer-level (RTL) or gate-level designs that improves the security of scan chain-based design-for-testability (DFT) structures. In various embodiments, the scan-based architecture includes invisible scan chains that are hidden in such a way that an attacker cannot easily identify or locate the invisible scan chains for exploitation and revealing internal secure information of the design. The invisible scan chains are dynamically configurable into a scan chain with select flip-flops, such that scan paths of the invisible scan chains may be different between different designs, chips, or testing operations. Various embodiments further employ key-based obfuscation by combining a scan control finite state machine with existing state machines within a design, which improves design security against unauthorized use and increases confidentiality. Specific sequences of key patterns cause the design to transition into a test mode or a normal mode.

20 Claims, 9 Drawing Sheets

(51) Int. Cl.
*G06F 30/33* (2020.01)
*G06F 115/08* (2020.01)

(58) Field of Classification Search
USPC .................. 714/726, 729, 727, 736, 731
See application file for complete search history.

(56) References Cited

U.S. PATENT DOCUMENTS

| 2004/0064770 | A1* | 4/2004 | Xin | G01R 31/318555 |
| | | | | 714/726 |
| 2008/0195346 | A1* | 8/2008 | Lin | G01R 31/318575 |
| | | | | 702/120 |
| 2016/0252573 | A1* | 9/2016 | Rajski | G01R 31/318555 |
| | | | | 714/727 |
| 2023/0228815 | A1* | 7/2023 | Bhunia | G01R 31/318536 |
| | | | | 714/726 |

OTHER PUBLICATIONS

Da Silva et al. Preventing Scan Attacks on Secure Circuits Through Scan Chain Encryption, Mar. 2019, IEEE, vol. 38, No. 3, pp. 538-550. (Year: 2019).*
Woo et al., A Secure Scan Architecture Protecting Scan Test and Scan Dump Using Skew-Based Lock and Key, Jul. 26, 2021, IEEE Access, vol. 9, pp. 102161-102176. (Year: 2021).*
"2022 Index IEEE Transactions on Computer-Aided Design of Integrated Circuits and Systems vol. 41," *In IEEE Transactions On Computer-Aided Design of Integrated Circuits and Systems*, vol. 41, No. 12, pp. 5737-5808, Dec. 12, 2022, Doi: 10.1109/TCAD.2022.3228126.

* cited by examiner

INVISIBLE SCAN ARCHITECTURE FOR SECURE TESTING OF DIGITAL DESIGNS

CROSS-REFERENCE TO A RELATED APPLICATION

This application claims the benefit of U.S. Provisional Application Ser. No. 63/299,589, filed Jan. 14, 2022, the content of which is hereby incorporated by reference in its entirety, including all figures, tables and drawings.

TECHNOLOGICAL FIELD

The present disclosure generally relates to the technical field of hardware intellectual property (IP), such as IP designs related to integrated circuits (ICs) for example. In particular, embodiments of the present disclosure relate to secure testing of designs.

BACKGROUND

Various embodiments of the present disclosure address technical challenges relating to scan chain testing of hardware IP designs, such as the vulnerabilities and exploitation of a scan chain of a design to leak critical information.

BRIEF SUMMARY

The semiconductor Intellectual Property (IP) designing and manufacturing of integrated circuits has become increasingly complex in part due to advances in design optimizations and manufacturing technology nodes. It is no longer economically feasible for domestic semiconductor companies to completely fabricate a design in-house—leading companies to adopt a horizontal business model. Semiconductor companies are now handing over their IP to potentially untrusted third parties across the globe for fabrication, causing major concerns for a design's confidentiality and integrity. In a zero-trust model, no entity along the supply chain excluding the semiconductor company itself is considered trusted. Hence, it becomes difficult to ensure security and trust throughout every stage of the supply chain. A critical vulnerability and difficult-to-protect asset under zero trust model is the scan chain. Scan chains are test infrastructure placed in a design to enable easily controllable and observable flip-flops for accessing hard-to-test internal signals in the design. This feature is traditionally disabled in-field. However, the scan chain can be attacked in several ways: 1) identifying flip flops in the scan chain, and 2) identifying and maliciously manipulating a scan enable signal. Once identified, the scan chain can be enabled in-field to leak sensitive information.

Various embodiments of the present disclosure provide a new scan-based architecture for any register-transfer-level (RTL) or gate-level design that improves the security of the traditional scan chain testability. In various embodiments, a scan chain of a design is essentially hidden in such a way that an attacker cannot easily identify or locate the scan chain to reveal internal secure information of the design. In particular, in accordance with various embodiments described herein, a scan chain of a design is "invisible" and dynamically defined (e.g., on-demand) upon activation. Various embodiments further employ key-based obfuscation which improves design security against unauthorized use and increases confidentiality. Key patterns are specifically configured and used to reduce an attacker's ability to enable the scan chain in-field.

BRIEF DESCRIPTION OF THE DRAWINGS

Having thus described the present disclosure in general terms, reference will now be made to the accompanying drawings, which are not necessarily drawn to scale.

Figure 1:
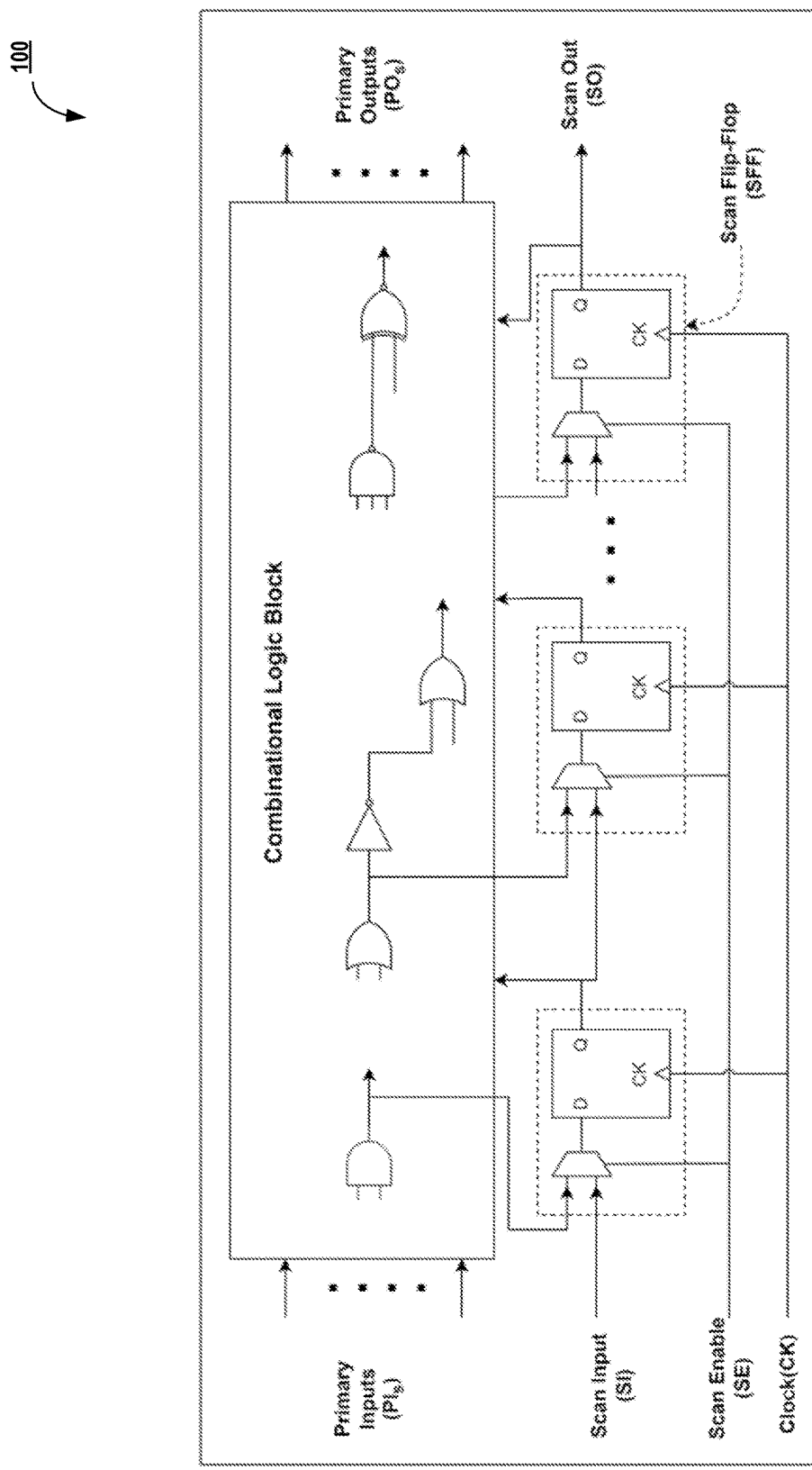

FIG. 1 provides a diagram of an example scan chain architecture of a design for background.

Figure 2A:
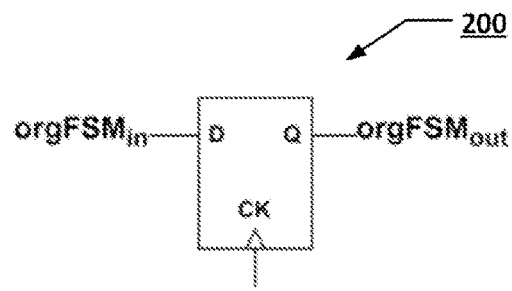
Figure 2B:
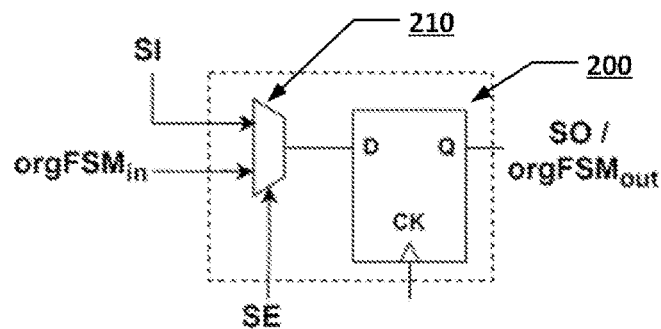
Figure 2C:
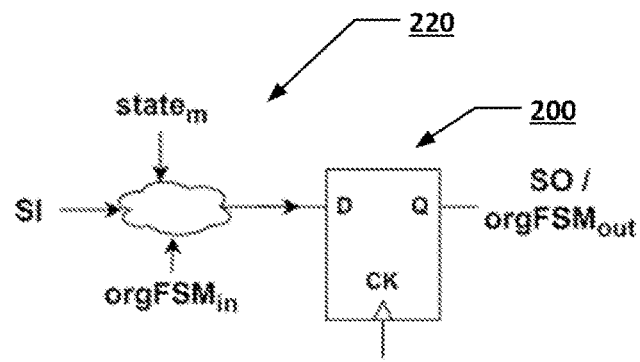

FIGS. 2A, 2B, and 2C illustrate example design components that can be used to constitute a scan chain for a design, according to some embodiments.

Figure 3:
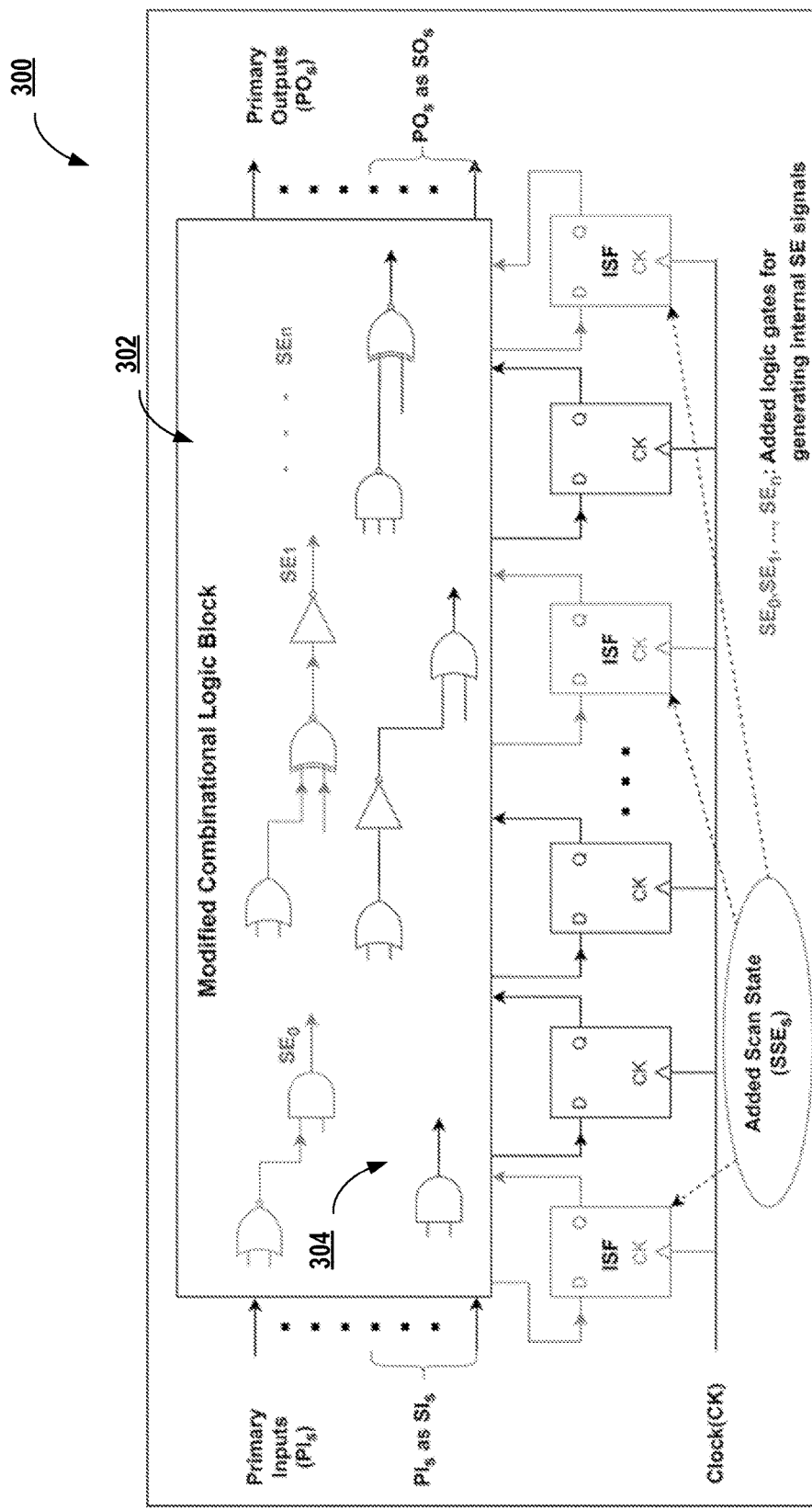

FIG. 3 provides a diagram illustrating an example scan chain architecture providing improved security for a design, according to some embodiments.

Figure 4:
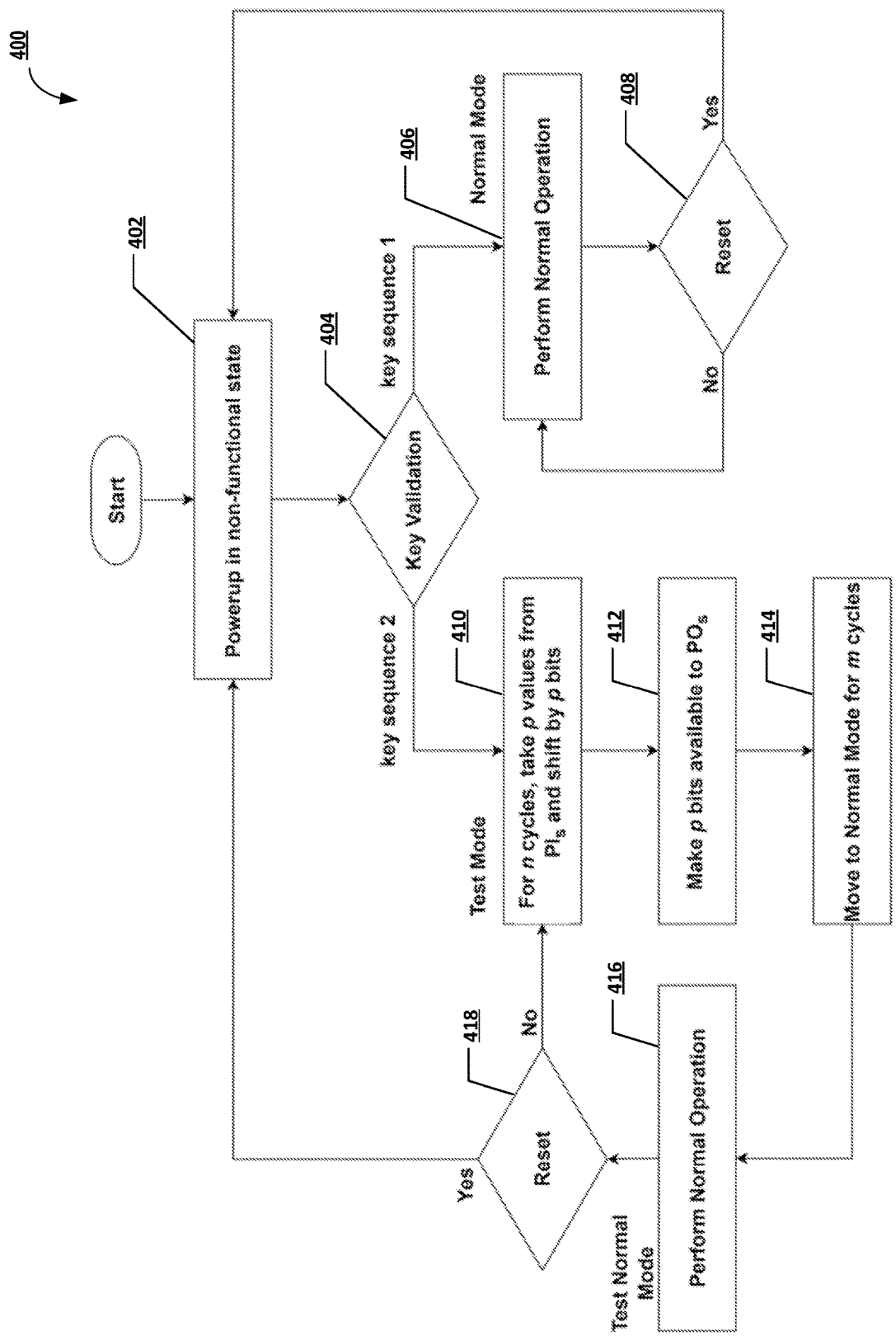

FIG. 4 provides a flowchart illustrating example operations performed in different modes with a scan chain architecture based at least in part on a set of conditions, according to some embodiments.

Figure 5:
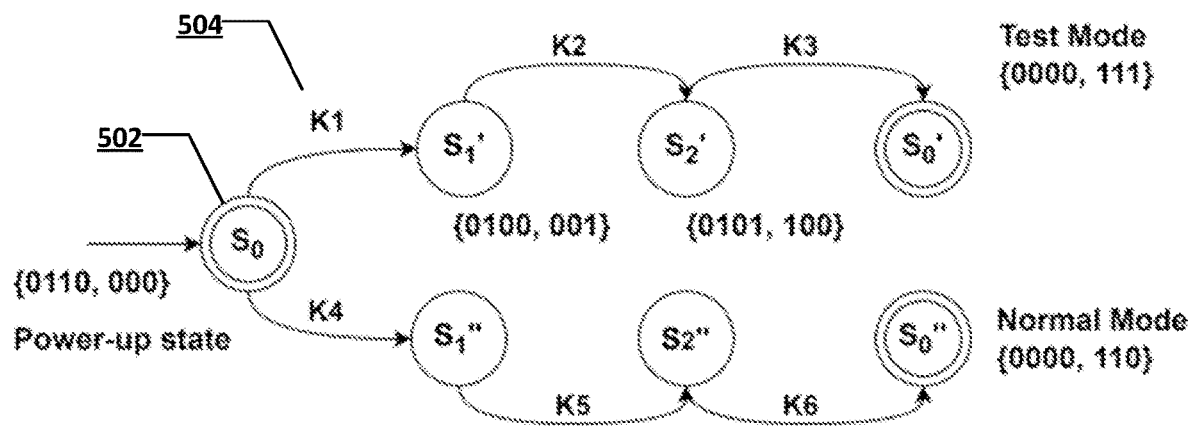

FIG. 5 provides a diagram illustrating validation of a key pattern to enable use of a scan chain architecture for testing a design, according to some embodiments.

Figure 6:
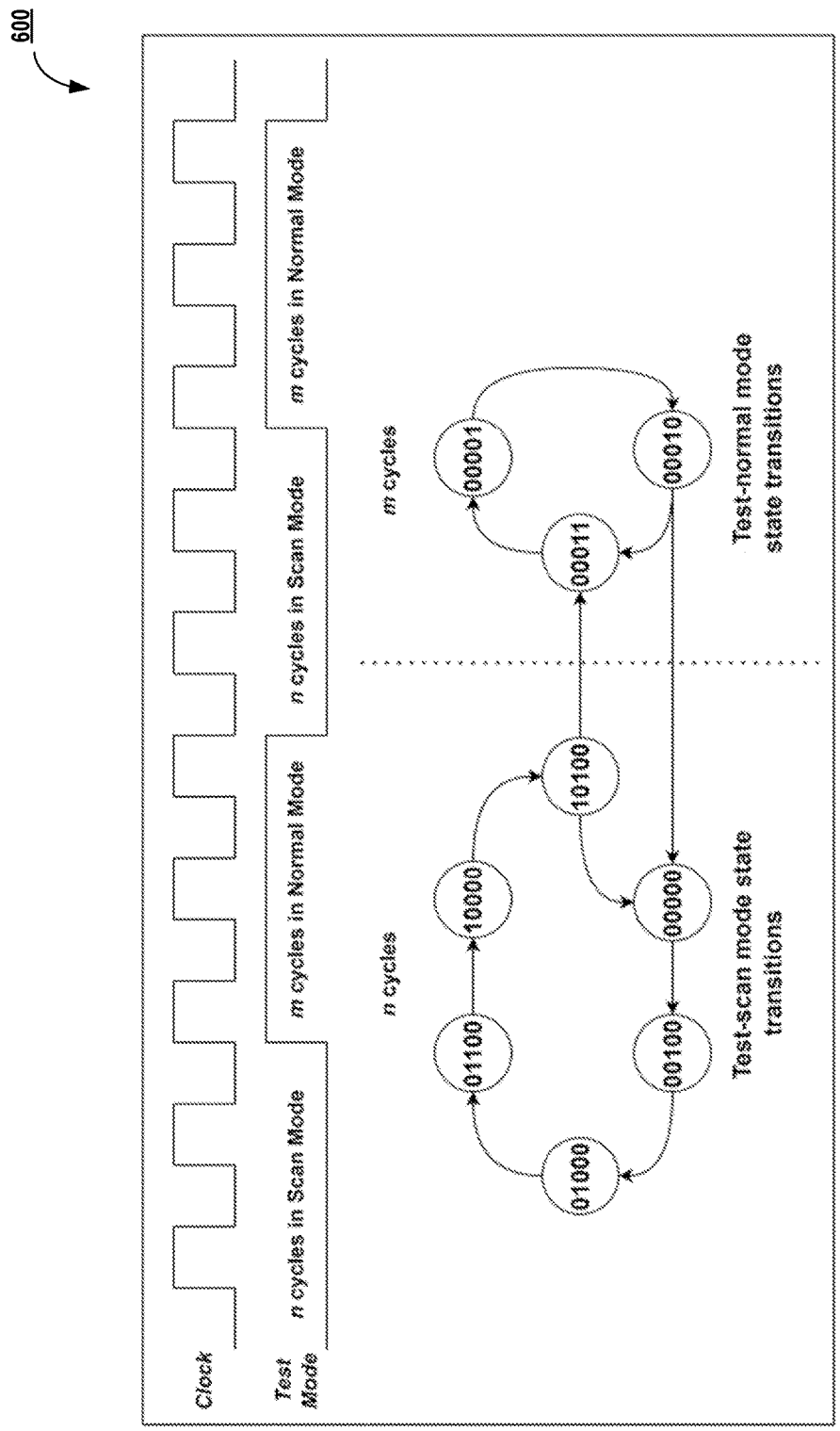

FIG. 6 provides a diagram illustrating state transitions occurring during testing of a design with a scan chain architecture, according to some embodiments.

Figure 7:
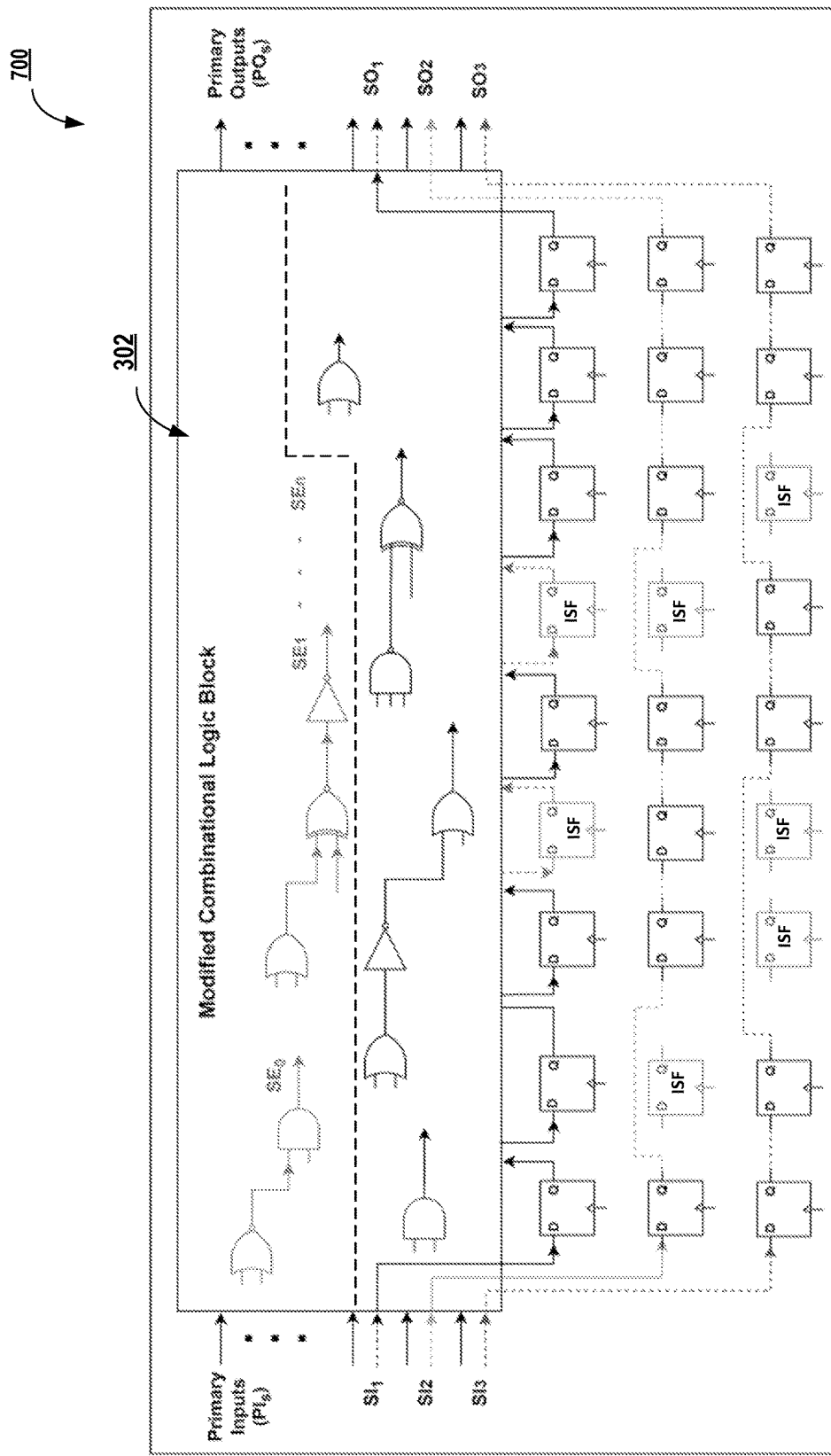

FIG. 7 provides a diagram illustrating an example scan chain architecture providing improved security for a design, according to some embodiments.

Figure 8:
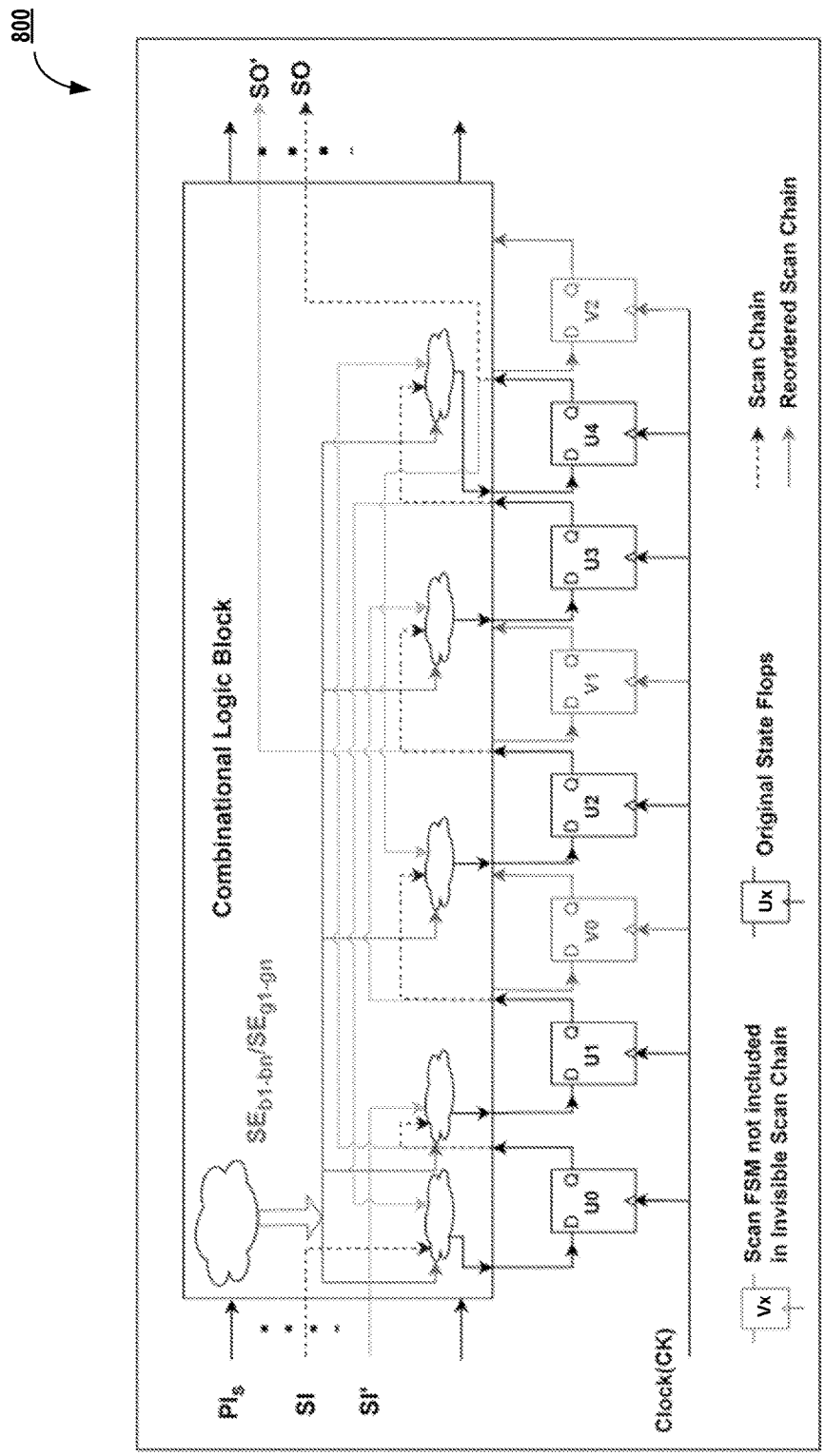

FIG. 8 provides a diagram demonstrating dynamic configuration of an example scan chain architecture of a design to provide improved security, according to some embodiments.

Figure 9:
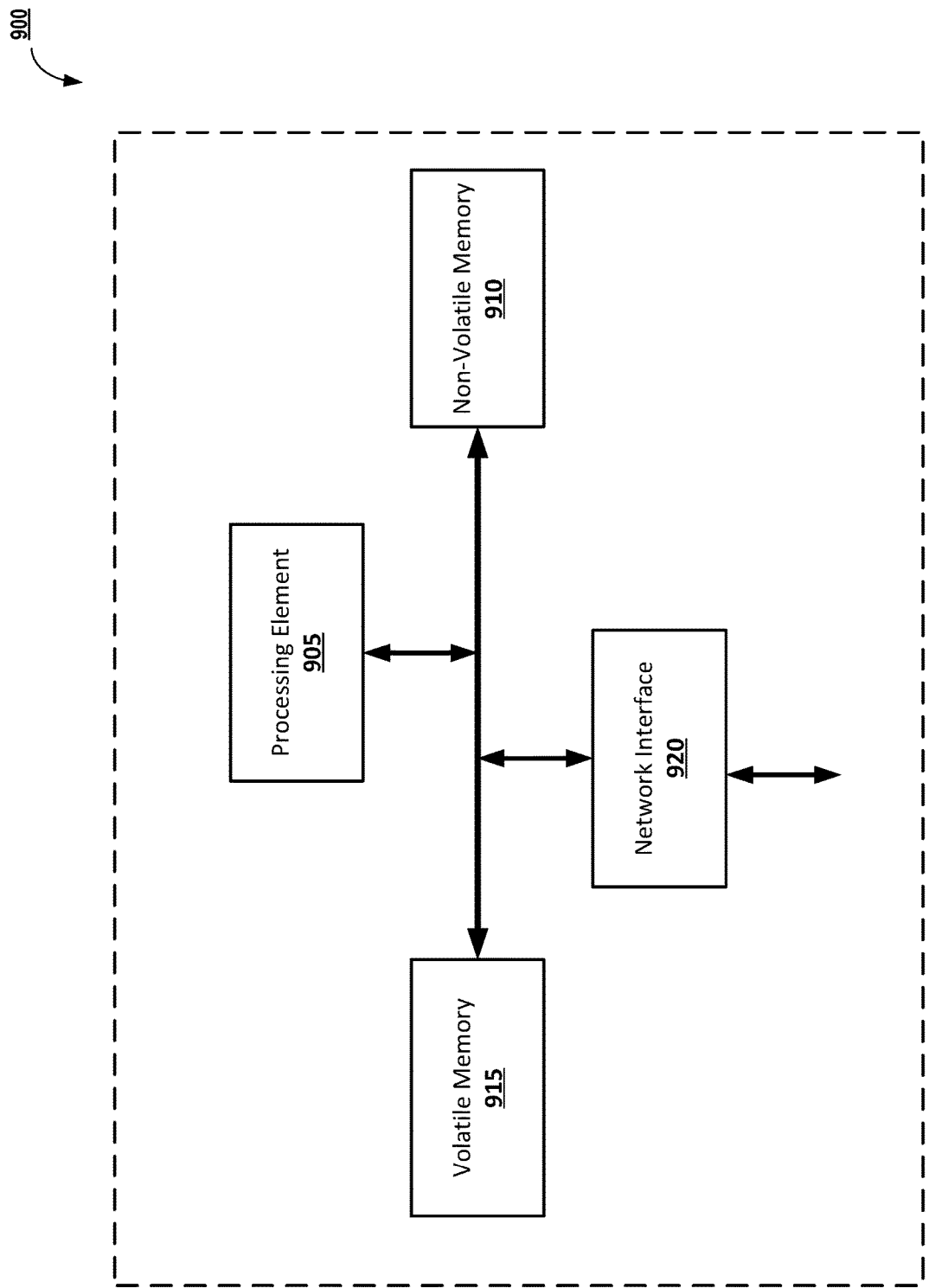

FIG. 9 provides a schematic of a computing entity that may be used in conjunction with some embodiments of the present disclosure.

DETAILED DESCRIPTION OF SOME EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

Integrated circuits, such as but not limited to Very Large Scale Integration (VLSI) chips, go through a series of stages before finally getting shipped out to customers. One critical stage involves the addition of testing infrastructure and routines which aim to provide coverage against manufacturing defects and specifically to increase the chance of detecting the manufacturing defects. To manufacture a design, the design must be verified through a set of tests. ATPG (Automatic Test Pattern Generation) test techniques are used to detect faults in the design. In ATPG, a set of test patterns is generated to trigger potential faults that can arise from manufacturing. Additionally, test practices such as Design for Testability (DFT) are used for testing a complex system.

If testability problems are found, either a new set of test points are inserted into the design, or the design may be modified. With the increase in complexity and size of the digital system, various methods—which are either ad-hoc or structured—exist and may be employed. In some instances, the ad-hoc methods may not be preferable, as a manual inspection is required to perform DFT modifications and test generations. An alternative form of DFT practice called structural DFT is introduced where extra logic is added to the design to perform thorough testing.

For complex sequential designs, it becomes difficult to generate test vectors to control and observe the internal signal's state. In such examples, it becomes hard for a sequential ATPG tool to traverse the entire state space from the primary inputs and subsequently observe the signal at the primary outputs. To tackle this issue, scan chain architectures and methods are introduced. Scan chains enable more direct control over the state space and over the observation of the internal states and signals in sequential designs. With the scan chain architectures and methods, extra multiplexed ("muxed") logic is added to a design in order to drive the original sequential elements.

FIG. 1 provides a diagram of an example scan chain architecture illustrating background concepts to provide a comprehensive context for understanding the various embodiments disclosed herein. As illustrated in FIG. 1, a scan chain of a design can include one or more scan flip-flops (SFFs), which include multiplex ("mux") logic and an original flip-flop present in the design. That is, a scan chain can recruit original flip-flops via the added mux logic, with this extra mux logic deciding the mode of the design in the scan method.

As a result, the SFF now may have two or more modes of operation with the scan method, such as a test mode or a normal mode. When the design is in test mode, these sequential elements are transformed into single or multiple shift registers, which specifically constitute the scan chain. A scan path is created in the design from the primary inputs (PIs) through the scan flip-flops, to the primary outputs (POs). In test mode, test data is serially pushed into these flip-flops through these scan chains to achieve desired internal states for the original flip-flops.

In order to observe the internal state of these flip-flops, the internal values can be scanned-out through primary outputs in a first-in-first-out (FIFO) manner, in some examples. The input and outputs of the scan flip-flops can be used as pseudo-primary-inputs and pseudo-primary-outputs while testing the design. Thus, the modified design eliminates the need for sequential ATPG.

As shown in FIG. 1, the scan enable (SE) signal decides the mode of the design—for example, test mode or normal mode. The added mux logic at each SFF decides which signals to be used to drive the original flip-flop. While testing the design (e.g., in test mode), scan input (SI) and scan enable (SE) signals are used to drive the original flip-flops directly in their desired states for testability purposes.

When the scan enable signal indicates the test mode, scan input (SI) is pushed into the first SFF on the first clock transition. In the next clock cycle, the logic value stored in the first SFF is shifted to the next SFF in the scan chain and the new value is pushed to the first SFF. The values are scanned in through the scan input and scanned out from the last flip-flop in one or more scan chains using the scan output (SO) in a FIFO manner. That is, the scan in and the scan out can involve multiple inputs and multiple outputs, in some examples. During the normal mode of operation, the original function data input signal is passed from the mux logic for all the sequential elements.

Though some examples of scan chains provide better controllability and observability of the internal states and signals of respective designs, they introduce multiple security vulnerabilities as secure internal information of the respective designs can be easily extracted and processed for malicious purposes through exploitation of the scan chains. For example, multiple scan chain-based attacks may involve an extraction of scan data and further analysis on this scan data. Such attacks are possible either by switching the design mode between the normal mode of operation and the test mode, or by keeping the design in test mode to extract the secret internal information. If an attacker gains access to the scan enable signal and/or is able to identify the scan path of the scan chain (e.g., the original flip-flops in the design that have extra mux logic and are then SFFs), then the attacker can manipulate the scan chain to leak critical information. Hence, various embodiments of the present disclosure provide secure scan testing architectures and methods to address the need for a security measure that can both secure the scan enable signal and hide the scan path in such a way that it is not easily accessible or traceable.

In various embodiments, secure scan chain architectures, methods, apparatuses, computer program products, systems, and/or the like are provided. In various embodiments, a flexible, "invisible", and on-demand scan chain is configured within a design to reduce ease of scan chain-based attacks, and various embodiments described herein may refer to such scan chains as invisible scan chains. Invisible scan chains are formed through additional sequential elements to then yield distributed scan enable signals. The hidden scan path depends on the internal state transitions of the newly introduced elements. As such, scan chain-based attacks that exploit knowledge of a scan enable signal and knowledge of SFFs within a design may be significantly secured against through the hidden scan path and distributed scan enable signals of the invisible scan chain, according to various embodiments described herein.

Thus, various embodiments introduce an invisible and on-demand scan chain that uses a logical chaining paradigm where no visible (e.g., statically defined) physical chain exists, as there is in FIG. 1. The scan chain architecture is introduced in such a way that is indistinguishable from other flip-flops in the design. In various embodiments, all flip-flops are configured to have high connections with all other flip-flops. Then, the scan chain shifting order or propagation path can be dynamically changed, such as between different chips or even between test application cycles. With such an invisible, dynamically defined, and transient scan chain shifting order, the likelihood of success of scan chain-based attacks is dramatically reduced.

As discussed, in various embodiments, a design may be configured with additional flip-flops that are not used for shifting and propagating a scan signal, but rather for controlling the state transitions for activating or disabling the scan process through distributed scan enable signals. In various embodiments, these additional flip-flops are used to realize one or more scan enable finite state machines (SEFSMs). In some examples, designs may include one or more original finite state machines, and these SEFSMs may be integrated into such original finite state machines. The SEFSMs are used in generation of a distributed or invisible scan enable signal composed of multiple internal signals and SEFSM states. Thus, a SEFSM improves security of the scan chain over the example scan enable signal demonstrated in FIG. 1, which has a single point of failure.

Specifically, a SEFSM may be initialized to a reset state upon powering up the design, and only after applying a sequence of secret key patterns will the SEFSM move to an enable state. While the SEFSM remains in the enable state, the original flip-flops perform the scan operation for a specific number of cycles and then move to the normal mode of operation, in various example embodiments. Then, normal operation will execute for a specific number of cycles and then come back to scan operation again and so on. In various embodiments, the scan input and the scan output are extracted as a vector from the primary inputs and the primary outputs, respectively, in multiple clock cycles.

Thus, some example PIs can be used as scan-input to shift in values, and as a key to configure the original FFs into the scan chain without introducing new PIs. In various embodiments, the original flip-flops of the scan chain can be loaded in parallel from multiple PIs (thus, having parallel load for the scan chain). Similarly, multiple scan FF values can be sent in parallel to the primary outputs (POs) for shifting out without introducing new POs (thus having parallel scan-output).

Overall, various embodiments of the present disclosure provide a secure scan architecture suitable for the zero-trust model of the semiconductor supply chain in which all entities outside the semiconductor company are untrusted. The secure scan architecture involving an invisible scan chain and methods of using the invisible scan chain can be integrated and used with many different designs that are gate-level or RTL. In some example embodiments, invisible scan chains are applied to designs having an adequate number of input-output pins such that some pins can be used as scan-in and scan-out ports. That is, configuration of an invisible scan chain into a design may first involve determining whether the design includes an adequate or threshold number of input-output pins.

Referring now to FIGS. 2A, 2B, and 2C, design components that are used in invisible scan chain architectures in accordance with various embodiments described herein are illustrated. FIG. 2A illustrates a typical flip-flop 200 that may be present in any digital design, whether the design involves no scan chain architecture, a physical scan chain architecture as exemplified in FIG. 1, or an invisible scan chain architecture.

As previously discussed, the typical flip-flop 200 shown in FIG. 2A can be augmented with muxed logic 210 to drive the typical flip-flop 200 as a scan flip-flop, as shown in FIG. 2B. FIG. 2B illustrates the muxed logic 210 receiving both a scan input and an original signal (orgFSMin), and then providing one or the other as input to the flip-flop based at least in part on the scan enable signal.

FIG. 2C illustrates a flip-flop that may be used for an invisible scan chain in accordance with various embodiments of the present disclosure. As with the illustrated embodiment of FIG. 2B, values are scanned in and out of the flip-flop generally; however, instead of just one scan enable (SE) signal controlling the scanning of values with the flip-flop, FIG. 2C illustrates complex combinational logic 220 used to determine the scanning of values into and out of the flip-flop. In various embodiments, the complex combinational logic 220 may differ from the muxed logic 210 of FIG. 2B by involving the use of one or more SEFSMs.

FIG. 3 illustrates an example of an invisible scan architecture 300, in accordance with various embodiments of the present disclosure. As shown, certain flip-flops are added into the scan chain, these added flip-flops are referred and indicated as invisible scan flip-flops (ISFs). Additional logic gates 302 are also synthesized to supplement original logic gates in order to generate distributed scan enable signals (e.g., via implementation of SEFSMs). In various embodiments, a design having the invisible scan architecture 300 enters test mode with the application of a secret key sequence where the original sequential elements are connected to form an invisible scan chain. The invisible scan chain comprises a pre-defined primary input, which is used as a scan in port (SI), and a scan path is realized using original flip-flops of the design. A pre-defined primary output is also used as a scan out port (SO). Once the design has entered test mode, test data is generally scanned in and scanned out in a FIFO manner from the primary inputs and the primary outputs.

Referring now to FIG. 4, a flowchart 400 is provided to illustrate example operations performed with an invisible scan architecture 300, as exemplified in FIG. 3. In various embodiments, the example operations may be performed by a design implementing the invisible scan architecture 300, or a physical construction thereof such as an IC or a computing entity generally. In some example embodiments, the design is caused to perform the example operation by a test apparatus in communication with the design. In particular, operations of the flowchart 400 are performed to transition the design to and between different modes, in various embodiments.

At operation 402, the design is configured to power up in a non-functional mode or state. In the non-functional mode, the design is configured to receive key patterns as user input. That is, a user may provide key patterns to the design (e.g., input via input/output circuitry, injected via a test apparatus).

At decision node 404, the design is configured to validate the key patterns provided by the user. In particular, the user input is validated for a specific set of key patterns provided in a specific order, or a key sequence. In various embodiments, key sequences are associated with different modes. For example, in the illustrated embodiment, a first key sequence is associated with a normal mode for the design, while a second key sequence is associated with a test mode for the design. Keys can be directly applied by a user at the primary input of the design to activate the scan operation (e.g., a test-scan mode) or to switch to other modes.

Upon determining that the input from the user is the first key sequence, the flowchart proceeds to operation 406, and the design is transitioned to a normal mode, or a mode of normal operation. Thus, the design is configured to perform its normal operation at operation 406, and the design may involve the flip-flops of the scan chain and manipulation of the values stored therein. Specifically, in the mode of normal operation, the scan chain is disabled, and flip-flops of the design resume their normal function. Generally, in various example embodiments, normal operation of the design may continue until a reset signal is received or detected at decision node 408. In various examples, the reset signal may be an input from a user, an error or exception arising in the normal operation, an intended break in normal operation, and/or the like. Upon detection of the reset signal at decision node 408, the design may return to the non-functional mode.

Returning to decision node 404, the design may determine that the user has input a second key sequence associated with a test mode. Accordingly, the flowchart proceeds to operation 410, and the design transitions to the test mode. At operation 410, the design is configured to take a p number of values from the PIs, and the taken or extracted values are shifted by a p number of bits. In various embodiments, the invisible scan chain of the design includes a p number of original flip-flops, hence the extraction of the p number of values and shifting by the p number of bits. In various embodiments, the extracted values are a scan input, and the scan input is extracted from the PIs over n number of clock cycles.

This n number of cycles may be referred to herein as a test-scan mode within the test mode. At operation 412, the design remains in the test-scan mode, and during the n number of cycles of the test-scan mode, previously available or present values of the p number of flip-flops of the invisible scan chain are scanned out from the pre-defined PO ports, in various embodiments.

At operation 414, once the flip-flops are loaded with the desired test values (e.g., the extracted and shifted values from the primary inputs), the design is configured to transition to a test-normal mode, or a second test mode. That is, the test-scan mode may be understood and referred herein as a first test mode, and the test-normal mode may be understood and referred herein as a second test mode. In various embodiments, the design is configured to remain in the test-normal mode or the second test mode for a m number of clock cycles, and in some examples, m may be a pre-defined number.

At operation 416, during the m cycles of the test-normal mode, the design performs the normal operation from some pre-defined internal state values which are acquired during the test-scan mode.

At decision node 418, the design is configured to determine whether a reset signal is received, and if so, the design may be transitioned again to the non-functional mode.

Otherwise, the design is configured to return to the test-scan mode upon the conclusion of the m number of cycles of the test-normal mode. In this transition to the test-scan mode, the invisible scan flip-flops have some modified values, which are scanned out (e.g., at operation 412) over the next n number of cycles. As before, new scan values can be scanned in simultaneous to scanning out the already present flip-flop values. That is, operations 410 and 412 can be performed approximately simultaneously. In various embodiments, the design is configured to perform the scan-in/scan-out operations for a user-defined number of test patterns.

Referring now to FIG. 5, a diagram is provided to illustrate validation of key patterns input by a user, for example, as performed by the design at decision node 404. Generally, as previously described, user input is validated for key patterns associated with different modes of the design to determine whether and which modes to which the design should be transitioned.

As shown in FIG. 5, validation states 502 are used in key validation in order to provide increased security at different stages of the electronics life cycle compared to one scan enable signal. In various embodiments, key patterns 504 are configured to cause transition between different validation states, and the different validation states include one validation state associated with the test mode and another validation state associated with the normal mode. Thus, a specific sequence of key patterns 504 can cause transition through various validation states 502 to a validation state for the test mode or the normal mode.

Accordingly, after a power-up state S0, the design can be transitioned to the test mode (comprising the test-scan mode and the test-normal mode, as discussed previously) upon the user providing the key patterns K1, K2, and K3 in the correct sequence. Similarly, to transition the design to the normal mode, the user needs to provide key patterns K4, K5, and K6 in the respective order to traverse the different validation states to the specific validation state for the normal mode. In various embodiments, each of the key patterns 504 may be an obfuscation key configured and known to a trusted entity for the design (e.g., the designer).

FIG. 6 provides a diagram illustrating other example state transitions that may occur while the design is in test mode, which as described previously, includes a test-scan mode and a test-normal mode in various embodiments. In particular, FIG. 6 provides a timing diagram demonstrating the alternative fashion of the test-scan mode and the test-normal mode, with the test-scan mode spanning n cycles and the test-normal mode spanning m cycles, and further provides a state transition diagram for each of the test-scan mode and the test-normal mode.

As shown in the state transition diagram and timing diagram, test data is scanned in for n number of cycles. During this scanning in of test data, the internal states of the added scan flip-flops (e.g., flip-flops indicated with "ISF" in FIG. 3) also changes based at least in part on the state assignments. Once the desired values are scanned into the original flip-flops through the invisible scan chain, the design is transitioned to the test-normal mode. The design stays in test-normal mode for the next m cycles, where it performs its normal set of operations from the loaded (e.g., scanned in) test values. After m number of cycles, the design is transitioned back to test-scan mode. After one [test-scan] →[test-normal] operation, valid internal data can be scanned out for testability purposes. As shown in the timing diagram, the design can repeatedly switch between the test-scan mode and the test-normal mode in order to scan in and test many different test patterns, in various embodiments.

The invisible scan architecture 300 can be modified in various embodiments to include multiple invisible scan chains for scanning in and out multiple bits at a time. FIG. 7 illustrates an example invisible multi-scan architecture 700 that includes three invisible scan chains, although it will be understood that, generally, an invisible multi-scan architecture 700 in accordance with various embodiments of the present disclosure can include two or more invisible scan chains. Generally, the invisible multi-scan architecture 700 includes original flip-flops used for normal operation of the design as well as added flip-flops (e.g., "ISFs") that are not part of the sequential scan path of a scan chain but that are used to implement the SEFSMs.

In the invisible multi-scan architecture 700, m bits of data are scanned in from multiple available PIs to the first m number of flip-flops, m being the number of different invisible scan chains in the architecture. That is, data is first scanned to the first flip-flop of each invisible scan chain. In consecutive cycles, the data is shifted to the next set of flip-flops across the different invisible scan chains, and finally, from the last flip-flops of each invisible scan chain, m bits of data are scanned out through some of the PO ports, specifically pre-defined scan out ports.

As previously discussed, additional logic gates 302 are added to the design in order to realize distributed scan enable signals. For example, FIG. 7 indicates $SE_0$, $SE_1$, $SE_n$ representing a distributed set of scan enable signals that are realized when the design is re-synthesized with user constraints. These scan enable signals are internally realized by the design, which gets enabled during the scan operation. In various embodiments, the scan enable signals $SE_0$, $SE_1$, $SE_n$ are not easily distinguishable from other signals in the design.

Thus, in the illustrated embodiment of FIG. 7, 3-bit test data is scanned in from input ports (SI1, SI2, SI3) which are part of the PIs. In the next couple of cycles, user defined test data is loaded into the original flip-flops (over n clock cycles in test-scan mode). Later, the design transitions to and remains in test-normal mode to perform the normal operation (spanning m clock cycles). Then, the design transitions again to test-scan mode to scan out the internal values in parallel fashion through scan out ports (SO1, SO2, SO3) of the POs. In various embodiments, added scan flip-flops (e.g., ISFs) are not included in the scan chains and are used to store scan states (SSEs), as described previously. Thus, generally, various embodiments provide improved scalability and efficiency, as multiple scan chains can be configured for simultaneous testing of multiple test patterns and test data.

Various embodiments of the present disclosure provide added security further through dynamic and on-demand configuration of invisible scan chains. FIG. 8 illustrates a dynamic invisible scan architecture 800, in which one or more invisible scan chains can be reordered from design to design, from chip to chip of a design, and/or from test operation to test operation of a design.

As illustrated, the dynamic invisible scan architecture 800 includes a plurality of original flip-flops present in the design for normal operation of the design, as well as a plurality of added invisible scan flip-flops (e.g., "ISFs" as exemplified in FIGS. 3 and 7) used to implement aspects of the dynamic invisible scan architecture 800 including the SEFSMs. In particular, the illustrated embodiment includes original flip-flops indicated by U0, U1, U2, U3, and U4, and further includes added invisible scan flip-flops indicated by V0, V1, and V2.

Then, in various embodiments, the invisible scan chain of the dynamic invisible scan architecture 800 may be dynamically ordered and reordered. Similarly, in some example embodiments, a design may have multiple invisible scan chains, some invisible scan chains being reordered versions of other invisible scan chains. In the illustrated embodiments, one invisible scan chain (highlighted by dashed lines) traverses from scan input (SI) to U0→U1→U2→U3→U4 to scan output (SO). Another invisible scan chain, which may be a reordering of this original invisible scan chain, traverses from scan input (SI') to U1→U3→U0→U4 to scan output (SO'), as indicated by solid lines within the combination logic block portion of FIG. 8.

Generally, various embodiments of the preset disclosure describe incorporation of different configurations or architectures of invisible scan chains that may include full or partial scan chains, single or multiple scan chains, single-bit or multi-bit scanning operation, and/or the like. In various embodiments, a user may choose which primary inputs and primary outputs are reused to perform as multiple scan-in and scan-out ports. Further, the scan-in and scan-out port order can be randomized such that the attacker would not know exactly which ports are used to perform the scan operation, in some embodiments. After incorporating the invisible scan chain, the design can then be optimized under input constraints in terms of area, power and delay.

In various embodiments, various aspects of invisible scan architectures can be configured by a user. For example, the security for the design can be enhanced by a user by increasing the key validation sequence to enter the test mode or by increasing complexity and/or length of each individual key pattern of a key validation sequence; however, these may also incur extra overhead in terms of area, power or delay. Output corruption is also configurable by the user when the design is in an invalid state. Various embodiments described herein can be combined with logic locking or sequential locking techniques to improve the security further. During test mode, after scanning in the values in the state flip flops, the number of cycles for which the design should be in test-normal mode (e.g., m cycles) is also configurable by the user. For example, for a processor with a 5 cycle pipeline, the user may configure m to be 5 cycles so that internal register values are scanned out after the conclusion of the processor pipeline. The number of cycles for which the design needs to be in test-normal mode can be configured statically or dynamically. For dynamic configuration, the user needs to provide a different set of key inputs to decide the number of cycles for test-normal mode. For a generic scan chain design, this number may be set to 1.

Various example embodiments of the present disclosure have been tested on some of the standard ISCAS89 benchmarks, and the modified designs were found to function as expected in either normal mode or test mode of operation. However, the re-synthesized designs incurred additional overheads in terms of area, power consumption, and critical path delay due to the inclusion of the new FFs (e.g., ISFs in FIGS. 3 and 7, Vx in FIG. 8). Table 1 below shows the comparison of the area, power, and time measurements for an original design, the design incorporated with a physical scan architecture as exemplified by FIG. 1 ("Traditional scan"), and the design incorporated with an invisible scan architecture as exemplified by FIG. 3. In the case of the physical scan architecture, original flip-flops are replaced with scan flip-flops (flip-flops with muxed logic) to obtain the area, power, and timing measurements. The last column in Table 1 represents the test coverage of designs using the Synopsys TetraMax tool on respective designs. In the case of the original design, coverage is not reported as there are no scan flip-flops present in the original design.

TABLE 1

| Design | Mode | Area | Power (mW) | Time | Area Overhead (%) |
|---|---|---|---|---|---|
| s27 | Original | 100.09 | $1.57 * 10^{-2}$ | 0.68 | NA |
| | Traditional scan | 118.86 | $1.6251 * 10^{-2}$ | 0.68 | 18.75 |
| | Invisible scan | 629.35 | $8.7379 * 10^{-2}$ | 0.92 | 528.78 |
| s208 | Original | 434.16 | $2.69 * 10^{-2}$ | 2.18 | NA |
| | Traditional scan | 484.21 | $2.7088 * 10^{-2}$ | 2.18 | 11.52 |
| | Invisible scan | 1712.89 | 0.2627 | 1.65 | 194.52 |
| s400 | Original | 852.06 | $7.81 * 10^{-2}$ | 0.3 | NA |
| | Traditional scan | 983.44 | $8.2027 * 10^{-2}$ | 0.3 | 15.41 |
| | Invisible scan | 2579.97 | 0.2541 | 2.21 | 202.79 |
| s953 | Original | 1792.96 | 0.1994 | 0.26 | NA |
| | Traditional sean | 1983.15 | 0.2023 | 0.26 | 10.60 |
| | Invisible scan | 4689.49 | 0.7953 | 1.76 | 136.46 |

From the Area Overhead (%) column, it can be observed that incorporating invisible scan increases the area significantly, but with a larger design, the area overhead is less. This additional area is introduced because of the added FFs and the invisible distributed scan enable signals.

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described with reference to flowchart 400. Thus, it should be understood that each operation of flowchart 400 may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

FIG. 9 provides a schematic of an exemplary computing entity 900 that may be used in accordance with various embodiments of the present disclosure. For instance, the computing entity 900 may be a device having a design (e.g., a chip) to be tested and implementing an invisible scan architecture, a device in communication with a design and responsible for testing the design, a device configured to simulate an IC or design for testing, and/or the like. Thus, the computing entity 900 may perform various example operations, such as those described in FIG. 4, to operate one or more invisible scan chains and generally to test designs.

In general, the terms computing entity, entity, device, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the field should appreciate that the computing entity 900 shown in FIG. 9 may be embodied as a plurality of computing entities, tools, and/or the like operating collectively to perform one or more processes, methods, and/or steps. As just one non-limiting example, the computing entity 900 may comprise a plurality of individual data tools, each of which may perform specified tasks and/or processes.

Depending on the embodiment, the computing entity 900 may include one or more network and/or communications interfaces 920 for communicating with various computing entities, such as by communicating data, content, information, and/or similar terms used herein interchangeably that can be transmitted, received, operated on, processed, displayed, stored, and/or the like. Thus, in certain embodiments, the computing entity 900 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 900 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 900 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 900 includes or is in communication with one or more processing elements 905 (also referred to as processors, processing circuitry, and/or similar terms used herein interchangeably) that communicate with other elements within the computing entity 900 via a bus, for example, or network connection. As will be understood, the processing element 905 may be embodied in several different ways. For example, the processing element 905 may be embodied as one or more complex programmable logic devices (CPLDs), microprocessors, multi-core processors, coprocessing entities, application-specific instruction-set processors (ASIPs), and/or controllers. Further, the processing element 905 may be embodied as one or more other processing devices or circuitry. The term circuitry may refer to an entirely hardware embodiment or a combination of hardware and computer program products. Thus, the processing element 905 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 905 may be configured for a particular use or configured to execute instructions stored in volatile or non-volatile media or otherwise accessible to the processing element 905. As such, whether configured by hardware, computer program products, or a combination thereof, the processing element 905 may be capable of performing steps or operations according to embodiments of the present disclosure when configured accordingly.

In various embodiments, the computing entity 900 may include or be in communication with non-volatile media (also referred to as non-volatile storage, memory, memory storage, memory circuitry and/or similar terms used herein interchangeably). For instance, the non-volatile storage or memory may include one or more non-volatile storage or non-volatile memory media 910 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or non-volatile memory media 910 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the non-volatile memory media 910 may also be embodied as a data storage device or devices, as a separate database server or servers, or as a combination of data storage devices and separate database servers. Further, in some embodiments, the non-volatile memory media 910 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the disclosure may be stored.

In various embodiments, the computing entity 900 may further include or be in communication with volatile media (also referred to as volatile storage, memory, memory storage, memory circuitry and/or similar terms used herein interchangeably). For instance, the volatile storage or memory may also include one or more volatile storage or volatile memory media 915 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In particular, volatile storage or volatile memory media 915 of the computing entity 900 includes the cache or cache memory, which may be exploited in unauthorized memory access cyberattacks to reveal information stored in private, concealed, restricted, and/or the like portions of the non-volatile storage or non-volatile memory media 910.

As will be recognized, the volatile storage or volatile memory media 915 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 905. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 900 with the assistance of the processing element 905 and operating system.

As will be appreciated, one or more of the computing entity's components may be located remotely from other computing entity components, such as in a distributed system. Furthermore, one or more of the components may be aggregated, and additional components performing functions described herein may be included in the computing entity 900. Thus, the computing entity 900 can be adapted to accommodate a variety of needs and circumstances.

Many modifications and other embodiments of the present disclosure set forth herein will come to mind to one skilled in the art to which the present disclosures pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claim concepts. Although specific terms are employed herein, they are used in a generic and descriptive sense only and not for purposes of limitation.

The invention claimed is:

1. A computer-implemented method comprising:
receiving one or more key patterns for testing a design of a hardware intellectual property (IP), wherein (a) the design comprises one or more invisible scan chains and (b) each invisible scan chain comprises a plurality of flip-flops connected on-demand upon verification of the one or more key patterns;
determining a mode for the design based at least in part on the one or more key patterns and using a scan enable finite state machine (SEFSM);
responsive to determining a test mode for the design:
loading a set of scan input data into the one or more invisible scan chains of the design over a first configurable number of clock cycles;
causing the design to perform a normal operation for a second configurable number of clock cycles; and
obtaining a set of scan output data from the one or more invisible scan chains of the design over the first configurable number of clock cycles; and
performing one or more automated actions based at least in part on whether the set of scan output data is in accordance with an expected set of scan output data.

2. The method of claim 1, wherein the SEFSM is realized within the design using a plurality of invisible scan flip-flops present in the design.

3. The method of claim 2, wherein the one or more invisible scan chains comprise a plurality of original flip-flops different than the plurality of invisible scan flip-flops.

4. The method of claim 3, wherein the plurality of original flip-flops is used by the design to perform the normal operation.

5. The method of claim 1, wherein each of the one or more invisible scan chains is associated with a configurable scan path spanning a plurality of original flip-flops.

6. The method of claim 1, the method further comprising:
modifying the configurable scan path of a particular invisible scan chain based at least in part on identifying a second plurality of original flip-flops present in the design.

7. The method of claim 1, wherein the set of scan input data is loaded into each flip-flop of the one or more invisible scan chains in a first-in first-out (FIFO) manner.

8. The method of claim 1, wherein the mode for the design is determined further based at least in part on a particular sequence with which the one or more key patterns are received.

9. A system comprising one or more processors, a memory, and one or more programs stored in the memory, the one or more programs comprising instructions configured to cause the one or more processors to:
receive one or more key patterns for testing a design of a hardware intellectual property (IP), wherein (a) the design comprises one or more invisible scan chains and (b) each invisible scan chain comprises a plurality of flip-flops connected on-demand upon verification of the one or more key patterns;

determine a mode for the design based at least in part on the one or more key patterns and using a scan enable finite state machine (SEFSM);

responsive to determining a test mode for the design:
load a set of scan input data into the one or more invisible scan chains of the design over a first configurable number of clock cycles;
cause the design to perform a normal operation for a second configurable number of clock cycles; and
obtain a set of scan output data from the one or more invisible scan chains of the design over the first configurable number of clock cycles; and perform one or more automated actions based at least in part on whether the set of scan output data is in accordance with an expected set of scan output data.

10. The system of claim 9, wherein the SEFSM is realized within the design using a plurality of invisible scan flip-flops present in the design.

11. The system of claim 10, wherein the one or more invisible scan chains comprise a plurality of original flip-flops different than the plurality of invisible scan flip-flops.

12. The system of claim 11, wherein the plurality of original flip-flops is used by the design to perform the normal operation.

13. The system of claim 9, wherein each of the one or more invisible scan chains is associated with a configurable scan path spanning a plurality of original flip-flops.

14. The system of claim 9, the one or more programs comprising instructions configured to further cause the one or more processors to:
modify the configurable scan path of a particular invisible scan chain based at least in part on identifying a second plurality of original flip-flops present in the design.

15. The system of claim 9, wherein the set of scan input data is loaded into each flip-flop of the one or more invisible scan chains in a first-in first-out (FIFO) manner.

16. The system of claim 9, wherein the mode for the design is determined further based at least in part on a particular sequence with which the one or more key patterns are received.

17. An apparatus, the apparatus comprising at least one processor and at least one memory, the at least one memory having computer-coded instructions therein, wherein the computer-coded instructions are configured to, in execution with the at least one processor, cause the apparatus to:
receive one or more key patterns for testing a design of a hardware intellectual property (IP), wherein (a) the design comprises one or more invisible scan chains and (b) each invisible scan chain comprises a plurality of flip-flops connected on-demand upon verification of the one or more key patterns;
determine a mode for the design based at least in part on the one or more key patterns and using a scan enable finite state machine (SEFSM);
responsive to determining a test mode for the design:
load a set of scan input data into the one or more invisible scan chains of the design over a first configurable number of clock cycles;
cause the design to perform a normal operation for a second configurable number of clock cycles; and
obtain a set of scan output data from the one or more invisible scan chains of the design over the first configurable number of clock cycles; and
perform one or more automated actions based at least in part on whether the set of scan output data is in accordance with an expected set of scan output data.

18. The apparatus of claim 17, wherein the SEFSM is realized within the design using a plurality of invisible scan flip-flops present in the design.

19. The apparatus of claim 18, wherein the one or more invisible scan chains comprise a plurality of original flip-flops different than the plurality of invisible scan flip-flops.

20. The apparatus of claim 19, wherein the plurality of original flip-flops is used by the design to perform the normal operation.

* * * * *